(12) United States Patent
Bivens et al.

(10) Patent No.: US 6,968,601 B2
(45) Date of Patent: Nov. 29, 2005

(54) COAT HOOK SYSTEM WITH INTEGRAL DAMPER AND LATCH

(75) Inventors: Steven L. Bivens, Kankakee, IL (US); Joseph J. Bella, Plainfield, IL (US)

(73) Assignee: Illinois Tool Works Inc, Glenview, IL (US)

( * ) Notice: Subject to any disclaimer, the term of this patent is extended or adjusted under 35 U.S.C. 154(b) by 4 days.

(21) Appl. No.: 10/739,894

(22) Filed: Dec. 18, 2003

(65) Prior Publication Data

US 2004/0163223 A1 Aug. 26, 2004

Related U.S. Application Data

(60) Provisional application No. 60/462,134, filed on Apr. 10, 2003, provisional application No. 60/445,966, filed on Feb. 7, 2003.

(51) Int. Cl.[7] .............................................. F16B 45/00
(52) U.S. Cl. ...................... 24/369; 224/313; 248/294.1
(58) Field of Search ............................. 24/582.1, 369; 16/438; 224/313, 553; 248/294.1, 304

(56) References Cited

U.S. PATENT DOCUMENTS

| 633,742 | A | * | 9/1899 | Turner ..................... 248/294.1 |
| 731,451 | A | * | 6/1903 | Hall et al. ................ 248/294.1 |
| 4,720,028 | A | * | 1/1988 | Takemura et al. .......... 224/553 |
| 5,975,594 | A | * | 11/1999 | Sandhu et al. ............ 248/294.1 |
| 6,095,469 | A | * | 8/2000 | Von Alman ................. 248/304 |
| 6,109,579 | A | * | 8/2000 | Huang ....................... 248/294.1 |
| 6,397,435 | B1 | * | 6/2002 | Gosselet ...................... 16/438 |
| 6,663,067 | B2 | * | 12/2003 | Gordon ..................... 248/294.1 |

* cited by examiner

Primary Examiner—Robert J. Sandy
(74) Attorney, Agent, or Firm—Mark W. Croll; Paul F. Donovan

(57) ABSTRACT

A retractable coat hook system that may be used within automobile interiors includes an integral damper and latch mechanisms. The coat hook of the coat hook system may be opened or closed by pushing on the hook. The integral damper gives the coat hook a slow, smooth motion as it opens and closes and latches to the coat hook housing. The retractable coat hook system reduces the number of components typically used with known coat hooks, resulting in reduced costs and improved assembly operations.

16 Claims, 8 Drawing Sheets

COAT HOOK SYSTEM WITH INTEGRAL DAMPER AND LATCH

CROSS REFERENCE TO RELATED APPLICATIONS

This Non-Provisional Application claims benefit to U.S. Provisional Application Ser. No. 60/445,966 filed Feb. 7, 2003, and U.S. Provisional Application Ser. No. 60/462,134 filed Apr. 10, 2003.

FIELD OF THE INVENTION

The present invention relates generally to coat hooks that mount to the interior of an automobile and more specifically to retractable coat hooks that utilize integral damper and latch mechanisms.

BACKGROUND OF THE INVENTION

It is known that coat hooks are used within the interior of an automobile. These coat hooks are used to hang various items, including clothing and other articles of wear. The coat hooks are typically mounted to the interior ceiling or side walls of the automobile. In the past, the coat hooks were often mounted in a fixed relationship to the automobile interior with the hook extending outwardly from the automobile interior. More recently, retractable coat hooks have been used within the automobile interior to provide a hook that is extendable from a stored position to an extended position. These coat hooks are likewise retractable from the extended position to the stored position. These known hooks are mounted to and stored within a housing that was, in turn, mounted to the automobile interior. By manual application, such as pressing on the end of the hook, the hook would release from the stored position and extend outward from the housing to the open position. With some known retractable coat hooks, a damper was used to control the speed of the hook as it released from the stored position.

The known retractable coat hooks have several drawbacks. For instance, in order to cause the hook to release from the stored position and likewise retract back to the stored position within the housing, multiple components are required such as, pins, springs, and wireforms. Many of these components are mounted external to the housing and are exposed to inadvertent damage. For other retractable coat hooks, multiple, complex components are needed such as gear assemblies that require several gear components to control the extending and retracting of the hook. Because of the use of the multiple and complex components, the known retractable coat hooks require special assembly and have an overall high cost application. The present invention is directed at overcoming these and other known drawbacks with existing retractable coat hooks for use in automobiles or other applications.

SUMMARY OF THE INVENTION

The present invention is directed to a retractable coat hook system that may be opened or closed by pushing on the hook. The coat hook system of the invention includes the use of integral damper and latch mechanisms that give the coat hook a slow, smooth motion as it opens, closes, and latches to the coat hook housing. Unlike existing retractable coat hooks, the components of the present invention are internal to the coat hook housing. Moreover, the invention reduces the number of components typically used with known coat hooks, resulting in reduced costs and improved assembly operations.

Other features and advantages of the invention will become apparent to those skilled in the art upon review of the following detailed description, claims and drawings in which like numerals are used to designate like features.

Figure 1:
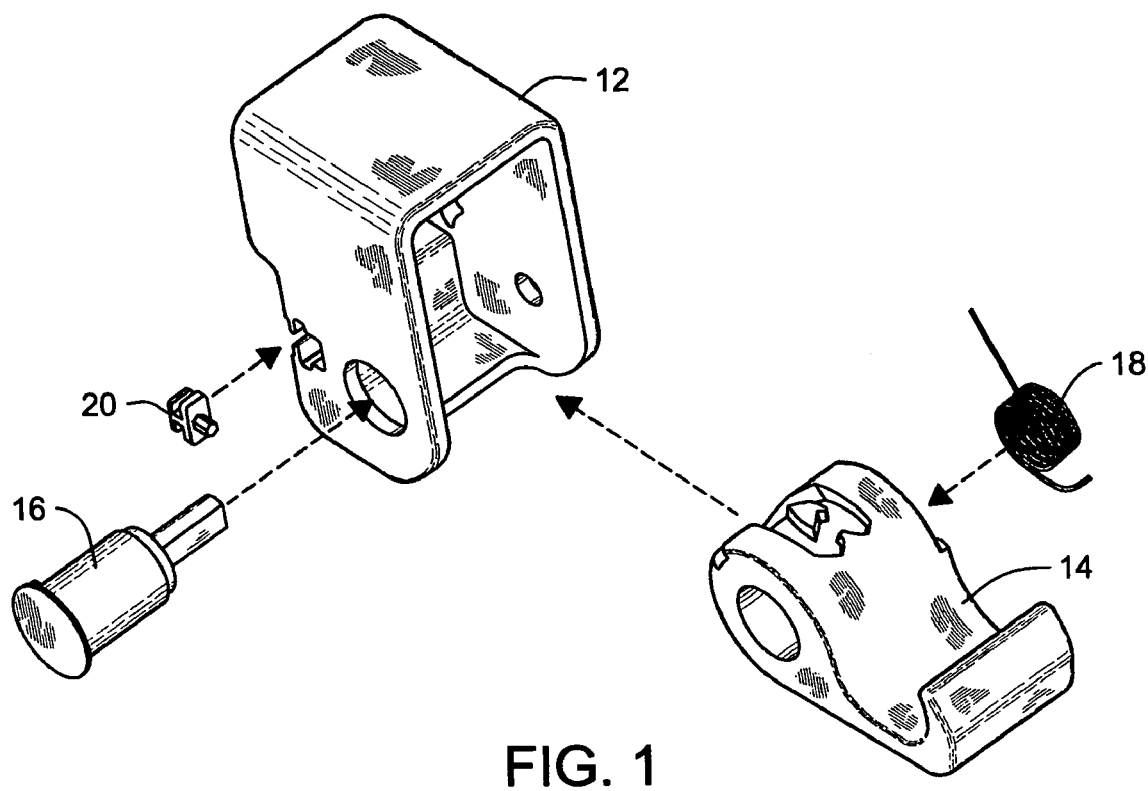
FIG. 1 is an isometric exploded view of an exemplary embodiment of a retractable coat hook system of the present invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE EMBODIMENTS

Figure 2:
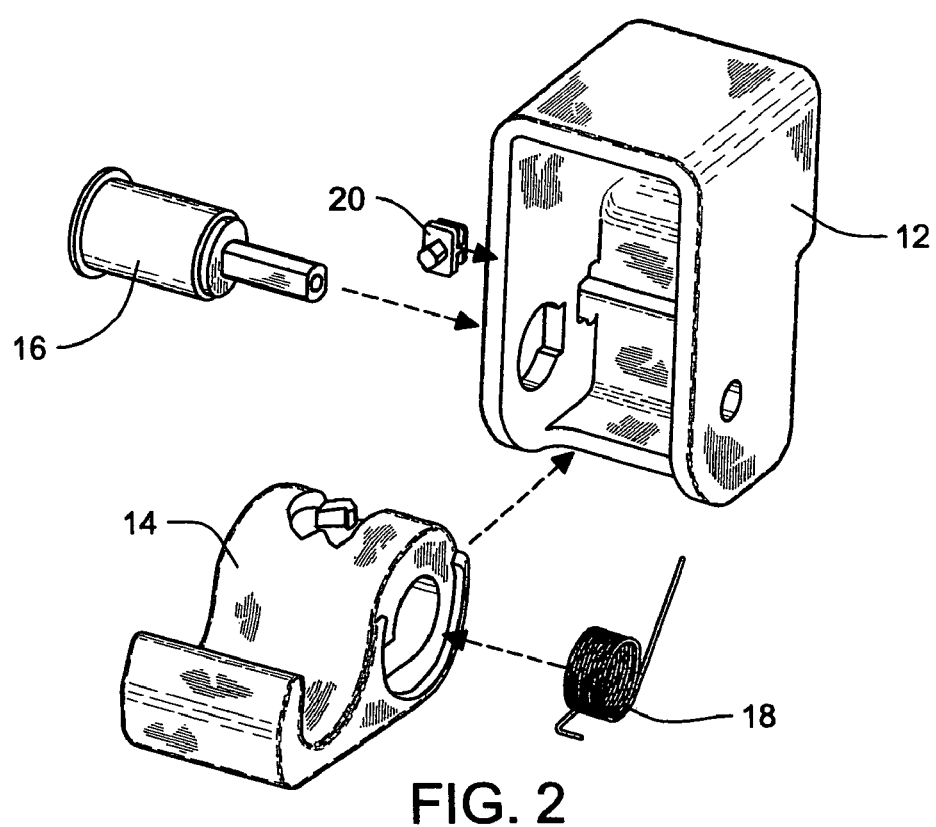
FIG. 2 is another isometric exploded view of an exemplary embodiment of a retractable coat hook system of the present invention.

Referring to FIGS. 1 and 2, an exemplary embodiment of the retractable hook system of the invention is depicted in a exploded view and includes a housing 12, a hook 14, a damper 16, a spring 18, and a follower 20. The structure and relationship of these exemplary components are described below.

Figure 5:
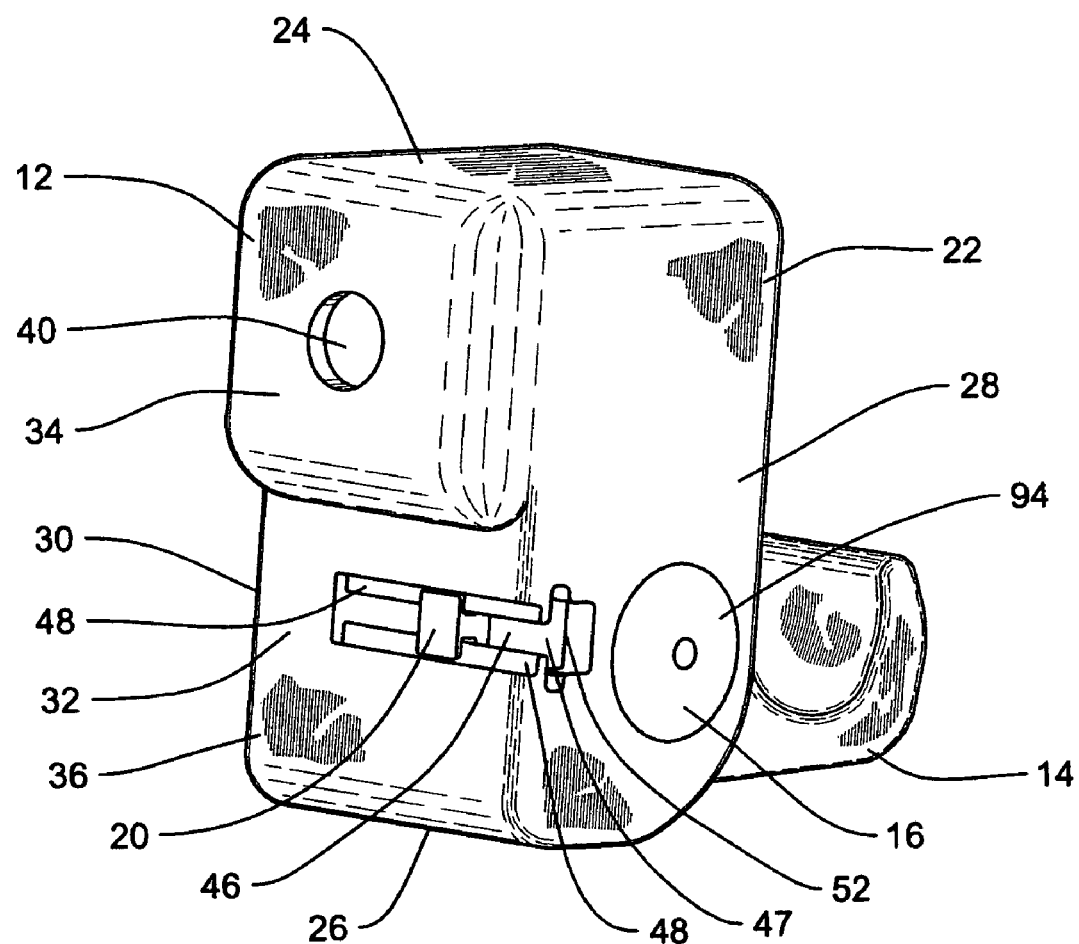
FIG. 5 is an isometric back view of the exemplary retractable coat hook system of FIG. 1.
Figure 6:
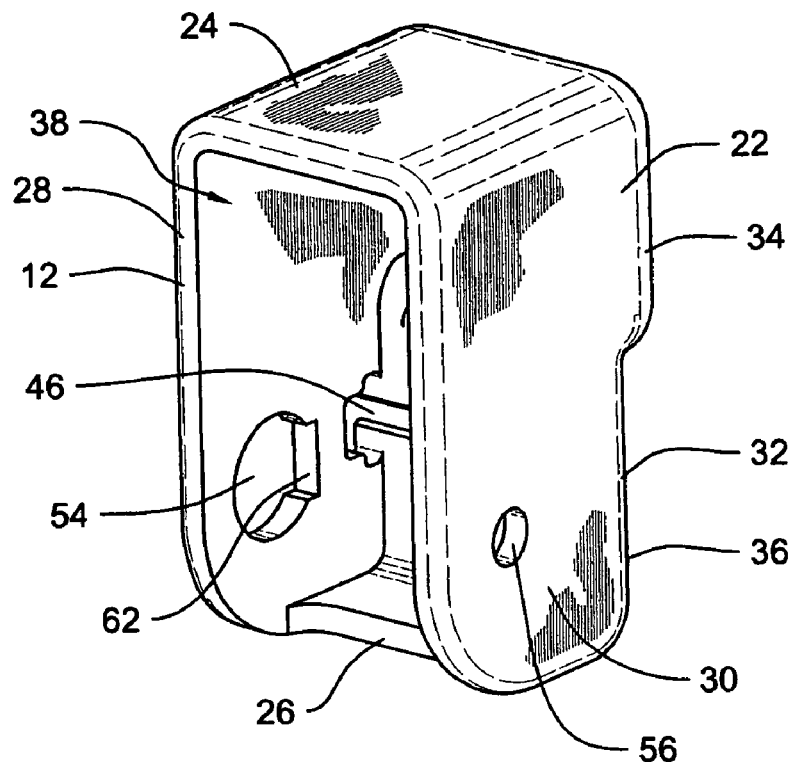
FIG. 6 is an isometric view of an exemplary housing that may be used with the retractable coat hook system of FIG. 1.

Referring to FIGS. 5 and 6, the exemplary housing 12 defines a rectangular shaped housing body 22 made from a plastic or other suitable material. The housing body 22 defines a top wall 24, a bottom wall 26, a first side wall 28, a second side wall 30, and a back wall 32. The back wall 32 further defines an upper back wall portion 34 and a lower back wall portion 36. The housing walls form a housing cavity 38. Assembled to the housing 12 within the housing cavity is the hook 14, damper 16, spring 18, and follower 20. The upper back portion 34 of the back wall 32 defines a flat planar surface and includes a mounting hole 40, as depicted in FIG. 5. The mounting hole 40 may be used for selective mounting of the housing body 22 to an interior surface wall of a vehicle through the use of a fastener, not shown. One of skill in the art will understand that other suitable mounting techniques may be used to assemble the invention onto the interior wall of the vehicle, or onto any other wall or surface where it is desirable to mount the present invention.

The exemplary housing body 22 further includes a slot 46 extending through the back wall 32 for slidably mounting the follower 20 to the housing 22. In an exemplary embodiment, the slot 46 extends across the lower back wall portion 36 from the first side wall 28 toward the second side wall 30. As depicted in FIG. 5, opposing grooves 48 are positioned adjacent to the slot 46 to provide a mounting surface for the follower 20 and also assist in retaining the follower 20 within the slot 46. The slot 46 extends through the first side wall 28 to define an opening 47. The opening 47 is sized and shaped to mate with the size and shape of the follower 20 to thereby permit the slidable mounting of the follower 20 onto the slot 46. The opening 47 is also shaped to define a restraining surface 52 for preventing the mounted follower 20 from sliding out of the housing 12 along the slot 46, after it is assembled. In other words, after the follower 20 is slidably mounted onto the slot 46, the follower 20 will contact the restraining surface 52 and will be prevented from sliding out of the housing 12. One skilled in the art will understand that the slot 46 may be re-configured, re-shaped, and modified and still achieve an object of the invention, namely, the slidable movement of the follower 20 relative to the housing 12.

Figure 4:
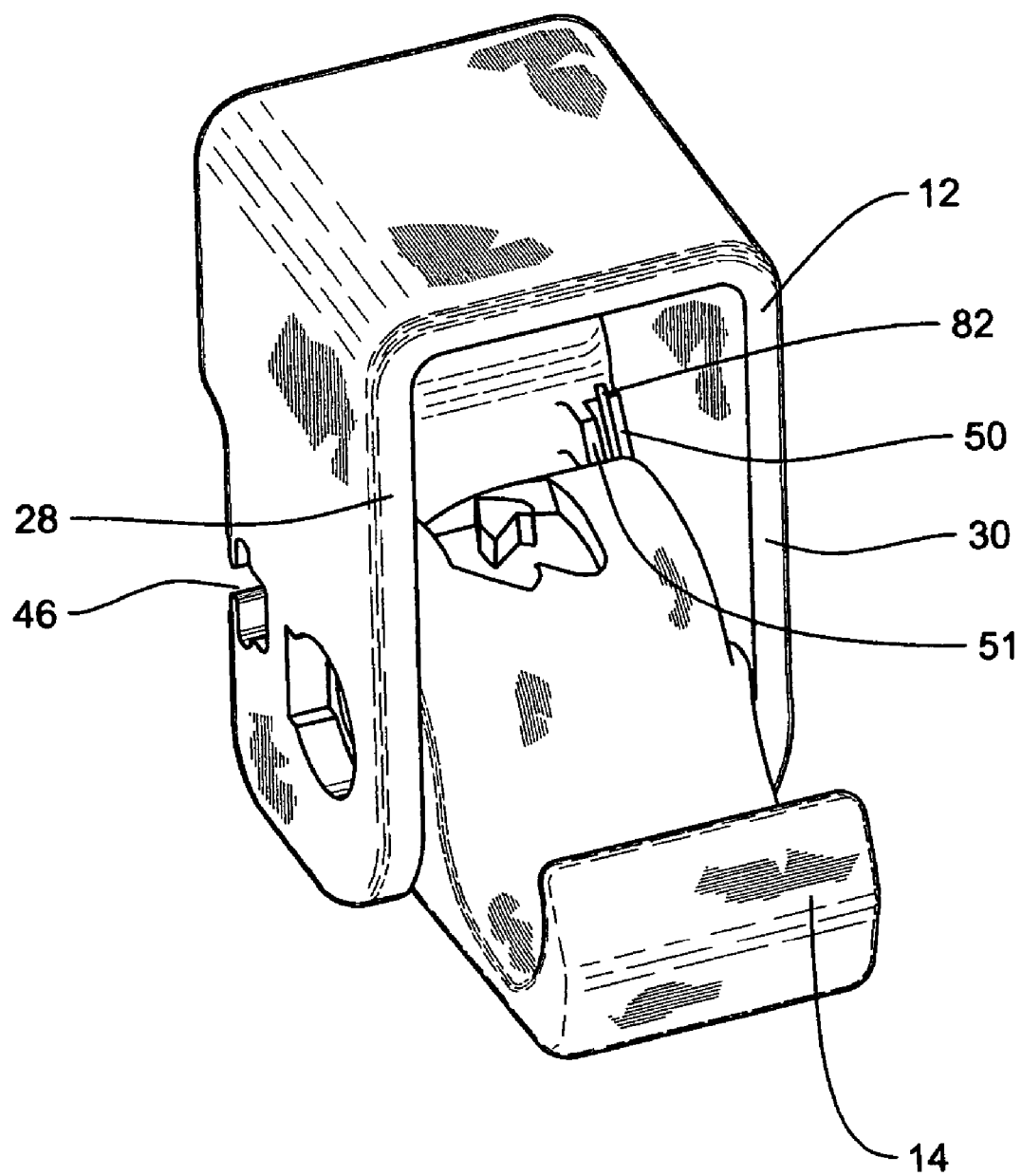
FIG. 4 is an isometric front view of the exemplary retractable coat hook system of FIG. 1.

Referring to FIG. 4, positioned within the housing cavity 38 adjacent to and above the slot 46 is an inclined contact surface 50, which serves as a contact surface for a spring leg 82 of the spring 18, as discussed in more detail below. The contact surface 50 further defines an outwardly extending retaining wall 51 to contain the first spring leg 82 of the spring 18 between the retaining wall 51 and the inner surface of the second side wall 30.

Figure 10:
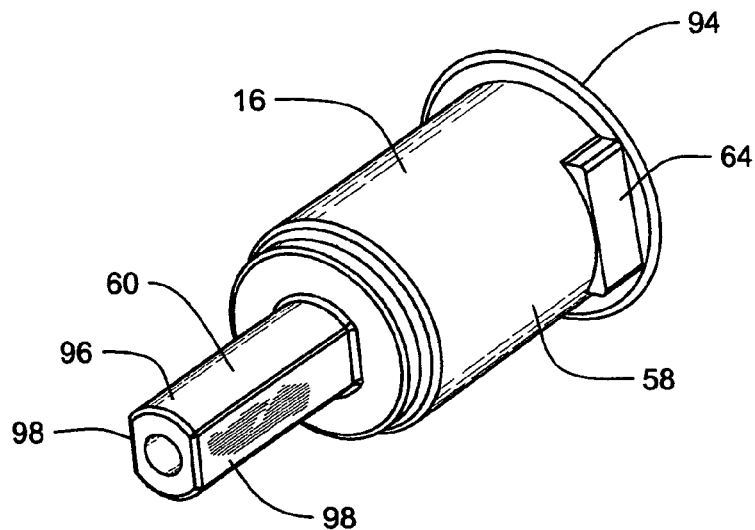
FIG. 10 is an isometric view of an exemplary damper that may be used with the retractable coat hook system of FIG. 1.
Figure 11:
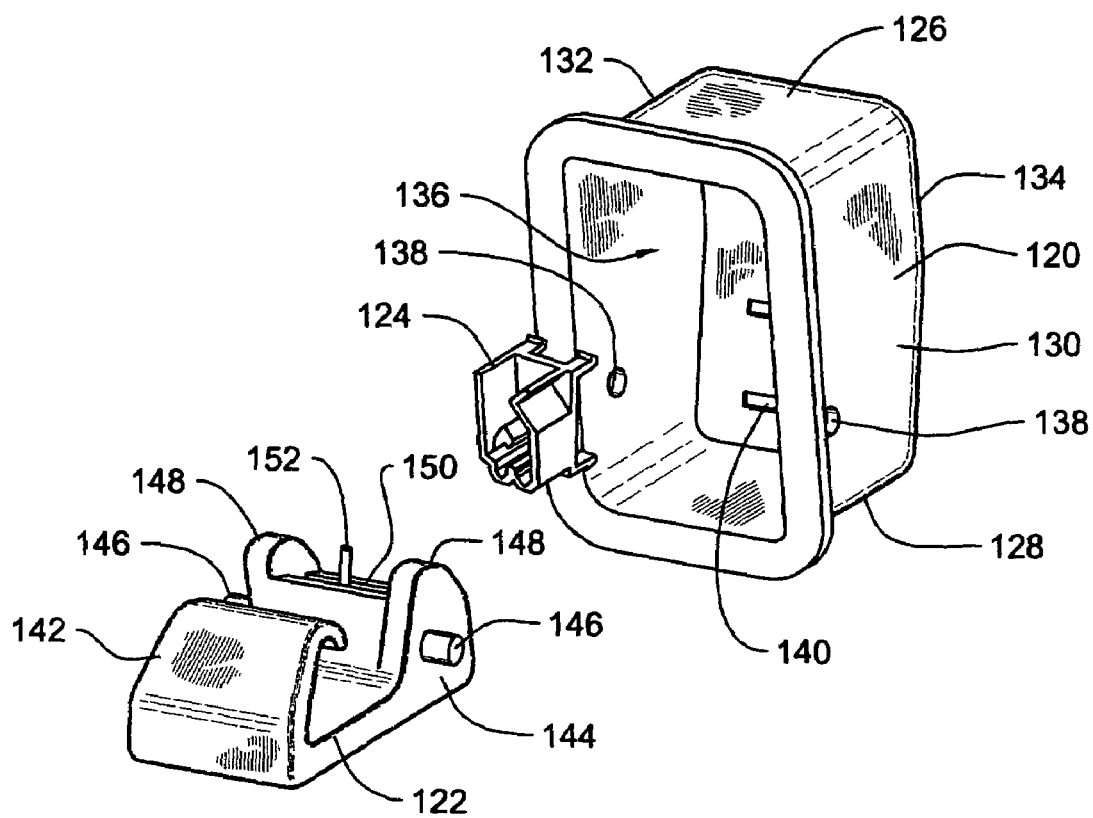
FIG. 11 is an isometric exploded view of another exemplary embodiment of a retractable coat hook system of the present invention.
Figure 12:
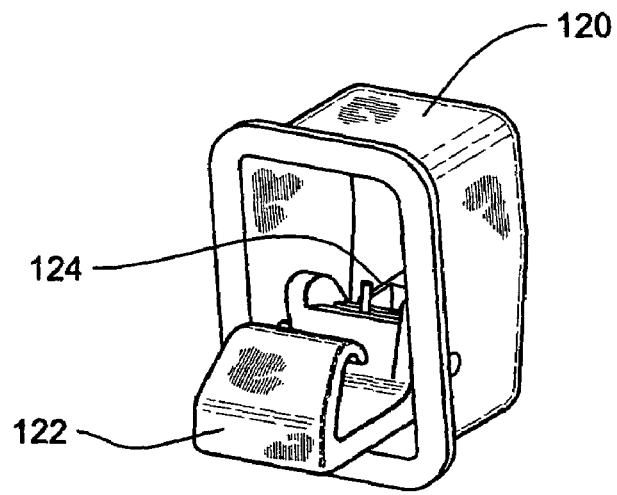
FIG. 12 is an isometric view of the exemplary retractable coat hook system of FIG. 11.

Referring to FIG. 6, the first side wall 28 defines a first mounting aperture 54 and the second side wall 30 defines a second mounting aperture 56, both of which are sized and shaped to permit the mounting of the damper 16 onto the housing 12. As depicted, the mounting aperture 54 defines a diameter that is larger than the diameter of the mounting aperture 56. As illustrated by FIGS. 2, 6, and 10, the mounting aperture 54 receives and mounts a damper outer body 58 of the damper 16, while the mounting aperture 56 receives a damper rotor 60 of the damper 16, both of which described in more detail below. The aperture 54 also defines a flat portion 62 that engages with a flat portion 64 of the damper outer body 58 (FIG. 10) to secure the damper outer body 58 within the aperture 54 and prevent rotation of the damper outer body 58 relative to the housing 12.

Figure 3:
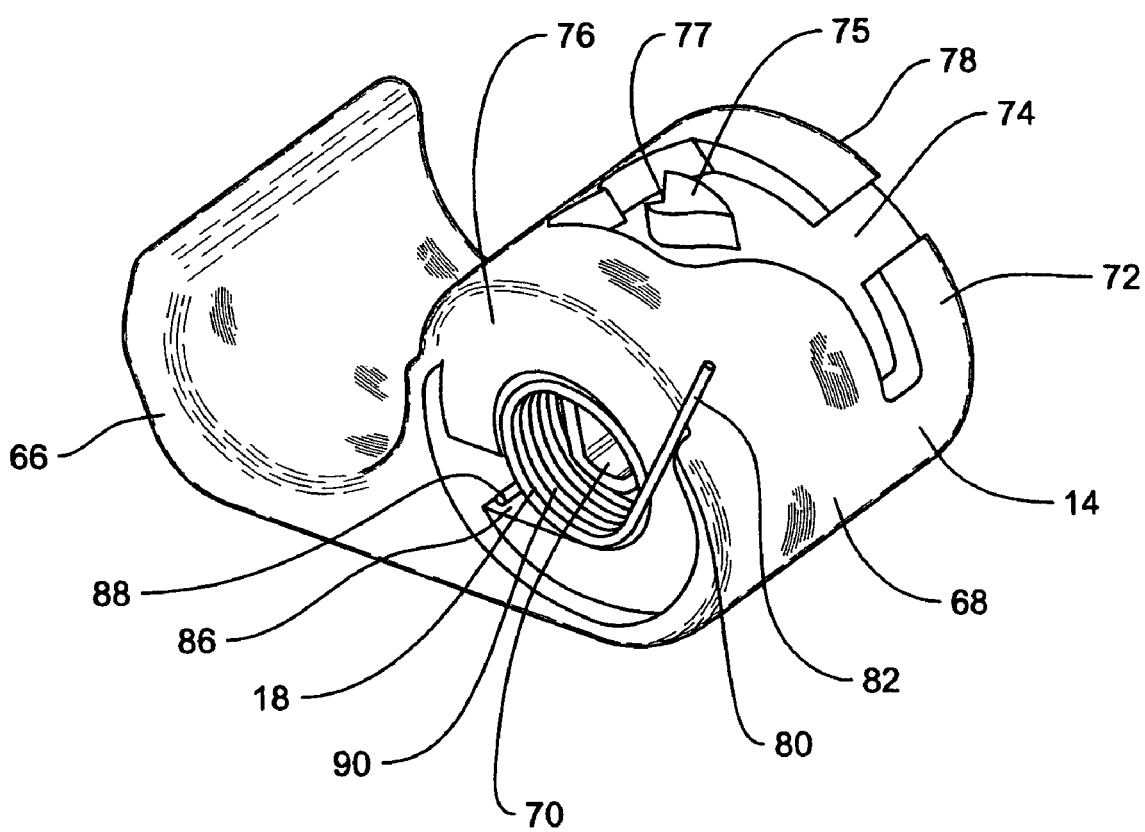
FIG. 3 is an isometric view of an exemplary hook that may be used with the retractable coat hook system of FIG. 1.
Figure 7:
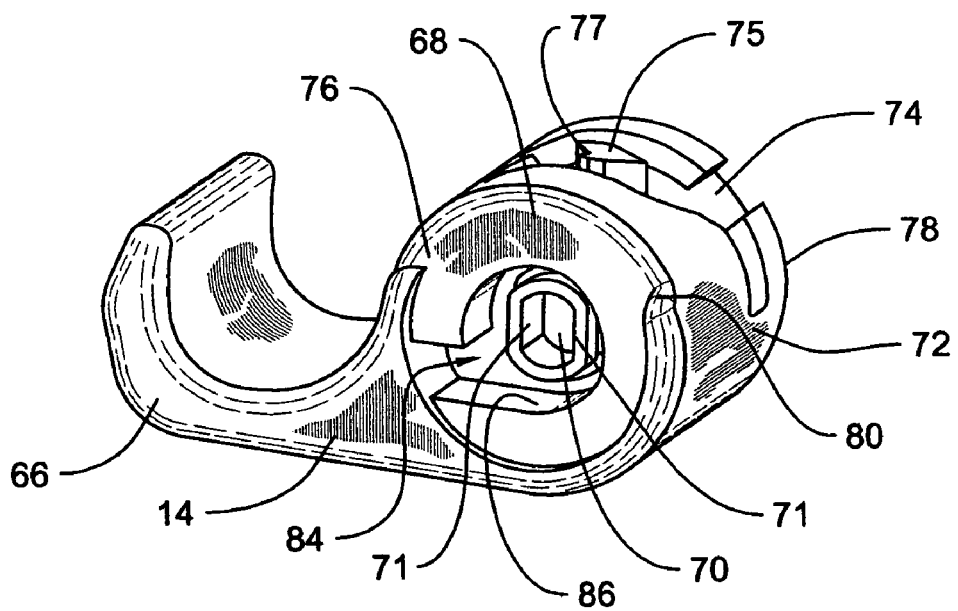
FIG. 7 is another isometric view of an exemplary hook that may be used with the retractable coat hook system of FIG. 1.
Figure 8:
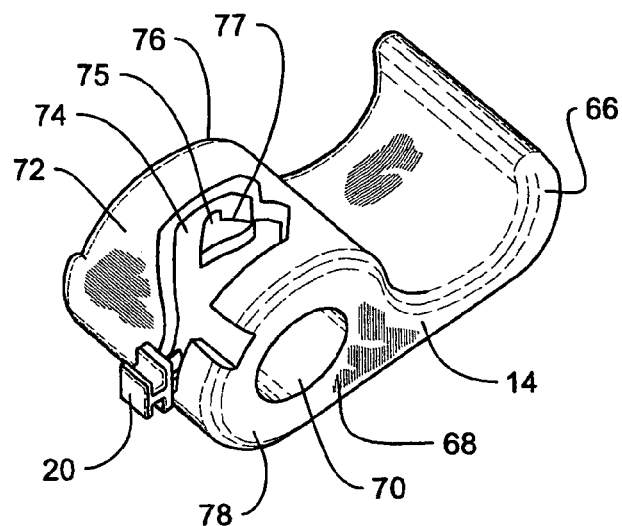
FIG. 8 is yet another isometric view of an exemplary hook that may be used with the retractable coat hook system of FIG. 1.

Referring to FIGS. 3, 7, and 8, the exemplary hook 14 defines a hook portion 66 and a rotation portion 68. The hook portion 66 is arcuate shaped and serves as a mounting member for hanging items or articles of wear onto the retractable hook system of the invention. The rotation portion 68 is formed integral with the hook portion 66 and is generally cylindrical in shape. The rotation end 68 defines an inner mounting hole 70 extending through the width of the rotation end 68 for receiving the damper 16 and spring 18 of the exemplary embodiment. As shown in FIG. 7, the inner mounting hole 70 defines opposing flat surfaces 71 that engage with the damper rotor 60, as discussed below. The rotation end 68 also defines an exterior surface 72 that further defines a cam path or guide path 74 formed integral with and into the exterior surface 72.

As illustrated in FIG. 8, the cam path 74 receives and engages the follower 20 and functions as a guide for the follower 20, which controls the opening and closing of the hook 14 from the housing 12. Specifically, as a user pushes on the hook 14, the hook 14 will rotate about the damper 16 while the follower 20 will move along in the cam path 74 to control the rotational movement of the hook 14. The follower 20 will simultaneously slide along in the slot 46 as it travels along the cam path 74. Positioned within the cam path 74 is an integral latch wall 75 defining a ledge 77. As the hook 14 rotates to a closed position, the follower 20 will seat on the ledge 77 to hold the hook 14 in the closed position. Specifically, as the follower 20 and in particular the extension 106 formed integral with the follower 20 (FIG. 9) moves along the cam path 74, the extension 106 will seat on the ledge 77 of the latch wall 75 to hold the hook 14 in the closed or retracted position within the housing 12. While the exemplary cam path 74 is depicted in the figures, the cam path 74 may have other configurations that permit the opening and closing of the hook 14 relative to the housing 12.

The rotation end 68 of the hook 14 further defines a first side 76 and an opposing second side 78. The first side 76 defines generally a flat planar surface and includes at its periphery a raised ledge 80 that also serves as a contact surface for the first spring leg 82 of the spring 18. The first side 76 also includes an opening 84 that forms with the inner mounting hole 70 to define an inner flat surface 86 that serves as a contact surface for a second spring leg 88 of the spring 18 (FIG. 3).

As illustrated in FIG. 3, mounted within the mounting hole 70 near the first end 76 is the spring 18. In the exemplary embodiment, the spring 18 is a torsion spring and defines the first spring leg 82, the second spring leg 88, and a coiled body 90. The first spring leg 82 extends outwardly from the coiled portion 90 along the raised ledge 80 of the hook 14 and, as shown in FIG. 4, will engage the contact surface 50 in the housing 12. As assembled, the first spring leg 82 will lie along the inclined surface of the contact surface 50 and will be contained between the retaining wall 51 and the inner surface of the second side wall 30 of the housing 12. The second spring leg 88 will engage the inner flat surface 86 of the hook 14. The coiled body 90 of the spring 18 provides a torsional spring force about the central axis of the hook 14. In an exemplary embodiment, the coiled body 90 provides a torsional spring force to bias the hook 14 to the open or extended position, upon a user pushing on the hook 14. It should be understood that with the present invention the coiled body 90 may be used to bias the hook 14 to a closed-hook position depending on the desired application.

Referring to FIG. 10, the damper 16 of the invention is a device that provides damping of the rotational motion of the hook 14. This damping will give the hook 14 a slow, smooth motion as it moves from the stored position to the open or extended position. The damper 16 may be either a one-way damper or a two-way damper. In other words, the damper 16 may provide damping of the rotational motion of the hook 14 in one direction or, alternatively, may provide damping of the rotational motion of the hook 14 in both directions. The damper 16 will serve not only as mechanism that controls the rotational movement of the hook but also as a hinge and a load bearing pin for the hook 14 in the housing 12. As a hinge and load bearing pin, the damper 16 eliminates the conventional pins used to hold the assembly together. In an assembled position, the damper 16 extends through the first and second mounting apertures 54, 56 of the housing 12, and through the inner mounting hole 70 of the hook 14, as illustrated by FIGS. 1, 2, and 5.

Referring back to FIG. 10, the exemplary damper 16 includes a damper outer body 58 and a damper rotor 60. The damper outer body 58 includes an end cap 94 that will contact the first side wall 28 of the housing 12 to prevent axial movement of the damper 16 after it is mounted to the housing 12. The outer body 58 also defines a flat portion 64 that engages the flat portion 62 of the aperture 54 (FIG. 6) to secure the damper outer body 58 within the aperture 54 and prevent rotation of the damper outer body 58 relative to the housing 12. The damper outer body 58 defines a generally cylindrical body for containing the damper rotor 60, which is mounted within the damper outer body 58. The damper rotor 60 will rotate within the damper outer body. Contained within the damper outer body 58 is a damping media that will give the retractable hook system of the invention a slow, smooth motion. The damping fluid may be any conventional gear damping fluid suitable for rotary dampers. The damper rotor 60 includes a shaft 96 that extends through the mounting aperture 56 (FIG. 6) in the second side wall 30 of the housing 12. In an exemplary embodiment, the shaft 96 defines opposing flat surfaces 98 that, in use, will engage with the flat opposing surfaces 71 formed in the inner mounting hole 70 within the hook 14 (FIG. 7). With this assembly and construction, rotational movement of the hook will transmit to the shaft 96 of the damper rotor 60. The damper rotor 60, which is mounted within the damper outer body 58 containing the damping fluid, will then dampen or control the rotational movement of the hook 14, thereby giving the hook 14 a slow, smooth motion.

Figure 9:
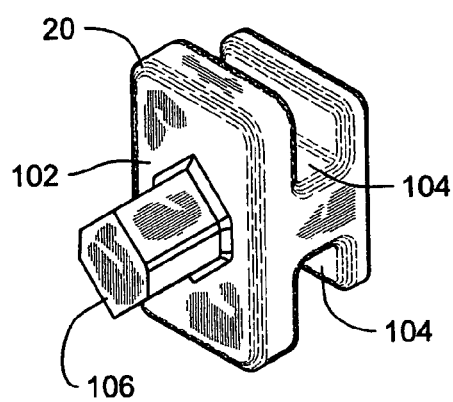
FIG. 9 is an isometric view of an exemplary follower that may be used with the retractable coat hook system of FIG. 1.

Referring to FIGS. 5 and 9, the follower 20 includes a follower body 102 that defines opposing grooves 104 that seat within the slot 46 formed in the housing 12. The follower body 102 also defines a tee-shaped head 108 that retains the follower 20 in the slot 46 and permits the follower 20 to move along the slot 46. Extending outwardly from the follower body 102 is a diamond-shaped extension 106 that engages with the cam path 74 formed within the rotation end 68 of the hook 14. As the hook 14 is moved from a retracted position to an open position, the extension 106 will follow the cam path 74 and will slidably move along the slot 46. The extension 106 will assist in the controlled rotational movement of the hook 14 about the damper 16. In addition, the extension 106 when engaged with the cam path 74 and specifically the ledge 77 of the latch wall 75 will serve as a latch mechanism to hold the hook 14 in the retracted or closed position within the housing 12. A user, by pushing on the hook 14, will cause the extension 106 to move off of the ledge 77, thereby releasing the hook 14 from the retracted position. Upon release from the retracted position, the torsional spring force of the spring 18 will cause the hook 14 to move to the extended position. The cam path 74 and the damper 16 cooperate to assist in providing the hook 14 with a slow, smooth rotational motion. One of skill in the art will understand that other shapes, sizes and configurations of the extension 106 are possible with the invention to provide a controlled movement of the hook 14 and to provide a latch mechanism to hold the hook 14 in the retracted or closed position within the housing 12.

Referring to FIGS. 11–14, there is depicted another exemplary embodiment of the retractable hook system, which includes a housing 120, a hook 122, and a latch 124. As with the other exemplary embodiment, the housing 120 is rectangular in shape and defines a top wall 126, a bottom wall 128, a first side wall 130, a second side wall 132, a back wall 134 and a housing cavity 136. Located on the first and second side walls 130, 132 are opposing mounting holes 138 used to mount the hook 122 to the housing 120. Located on the back wall 134 are a plurality of mounting holes or slots 140 used to mount the latch 124 to the housing 120, as discussed below.

Figure 13:
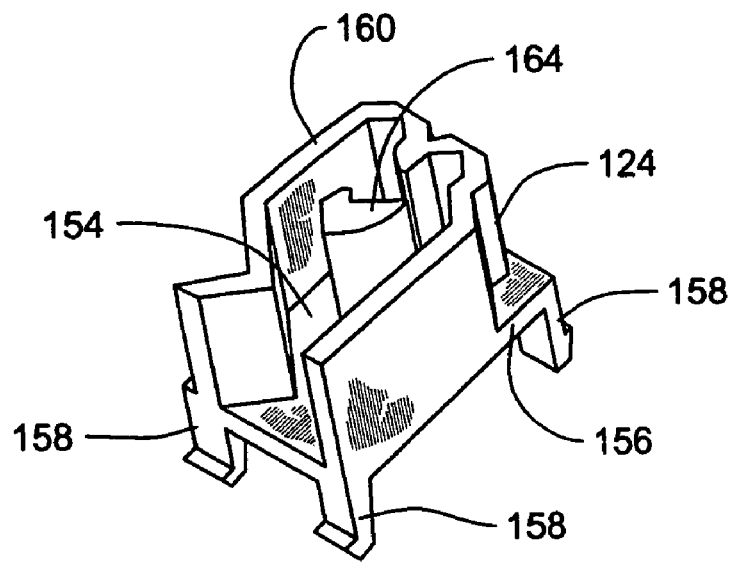
FIG. 13 is an isometric view of an exemplary latch that may be used with the exemplary retractable coat hook system of FIG. 11.

The hook 122 defines a hook portion 142 and a rotation end 144. Extending outwardly from opposing sides of the rotation end 144 are mounting posts 146 that engage with the mounting holes 138 in the side walls 130, 132 of the housing 120. The mounting posts 146 will snap fit into the mounting holes 138 and will permit the pivotal movement of the hook 122 from a stored or retracted position to an extended or open position, by a user simply pressing on the hook portion 142 of the hook 122. Located on the rotation end 144 are opposing rounded shoulders 148 that define a channel 150 between the shoulders 148. The channel 150 defines a rounded surface and includes an extension or boss 152 extending outwardly from the channel 150. In an assembled position, the extension or boss 152 engages with the cam path or guide path 154 on the latch 124 (FIG. 13). The exemplary extension or boss 152 extends radially outwardly and defines a diamond configuration for engagement with the cam path 154. One of skill in the art will understand that other shapes, sizes and configurations of the extension or boss 152 are possible with the present invention.

Figure 14:
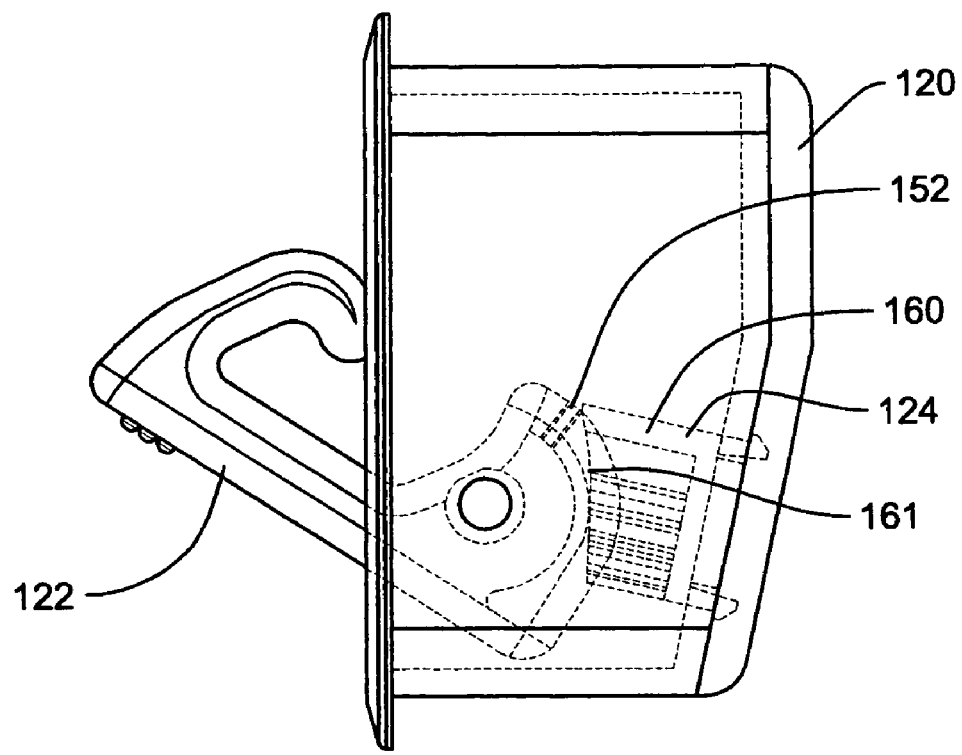
FIG. 14 is a side elevation view of the exemplary retractable coat hook system of FIG. 11.

The latch 124 is depicted in FIG. 13 and defines a base wall 156, and a plurality of mounting legs 158 extending outwardly from the base wall 156. The legs 158 are sized and shaped to snap fit within the mounting holes 140 located on the back wall 134 of the housing 120, as known in the art. Extending outwardly from the base wall 156, opposite the direction of the legs 158, is a cam path or guide path wall 160 that defines and forms the cam path or guide path 154. The cam path wall 160 defines a distal end 161 that, as shown in FIG. 14, is radiused or contoured for enhanced engagement of the cam path wall 160 with the rounded surface of the rotation end 144 of the hook 122, and enhanced engagement with the extension 152 that extends outwardly from the rotation end 144. Also extending outwardly from the base wall 156 is a latch wall that defines a ledge 164 on which will seat the extension 152 when the hook 122 is in a closed or retracted position. When the hook 122 is pushed to the closed or retracted position within the housing 120, the extension 152 will follow or travel along the cam path 154 until the extension 152 seats on the ledge 164 thus latching the hook 122 in the closed position within the housing 120. Likewise, when the hook 122 is pushed again, the extension 152 unseats from the ledge 164 and travels along the cam path 154 thus allowing the hook 122 to rotate to the open or extended position.

Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A retractable hook mechanism comprising:
   a hook defining a rotation end and a hook end, the rotation end further defining a mounting hole, an exterior surface, and a cam path formed in the exterior surface,
   a housing for containing the hook, the housing defining a back wall having a slot, opposing side walls, and at least one mounting aperture located in one of the side walls,
   a damper mounting the hook to the housing, the damper including an outer body and a rotor positioned within the outer body,
   a spring mounted within the mounting hole of the hook, and
   a follower slidably mounted within the slot, the follower operatively engaging the cam path in the exterior surface of the rotation end of the hook.

2. The retractable hook mechanism as set forth in claim 1, wherein the exterior surface of the rotation end includes an integral latch wall further defining a ledge.

3. The retractable hook mechanism as set forth in claim 2, wherein the damper outer body is mounted to the at least one mounting aperture in the side wall of the housing.

4. The retractable hook mechanism as set forth in claim 3, wherein the opposing side walls of the housing each contain a mounting aperture, and wherein the damper outer body is mounted to one of the mounting apertures and the damper rotor is mounted to the other mounting aperture.

5. The retractable hook mechanism as set forth in claim 1, wherein the spring contains at least one spring leg, the at least one spring leg contacts the housing.

6. The retractable hook mechanism as set forth in claim 1, wherein the spring contains a first spring leg and a second spring leg, the first spring leg contacts the housing and the second spring leg contacts the mounting hole in the rotation end of the hook.

7. The retractable hook mechanism as set forth in claim 1, wherein the follower includes a follower body mounted to the slot and an extension that operatively engages the cam path formed in the rotation end of the hook.

8. A retractable hook mechanism for use in an automobile interior comprising:
   a hook defining a rotation end and a hook end, the rotation end further defining a mounting hole, an exterior surface, end a cain path formed in the exterior surface,
   a housing for containing the hook, the housing defining a back wall having a slot, a first side wall having a first aperture, and a second side wall having a second aperture,
   a damper mounting the hook to the housing, the damper including an outer body and a rotor positioned within the outer body,
   a spring mounted within the mounting hole of the hook for biasing the hook from a stored position to an retracted position, and
   a follower slidably mounted within the slot, the follower operatively engaging the cam path in the exterior surface of the rotation end of the hook.

9. The retractable hook mechanism as set forth in claim 8, wherein the exterior surface of the rotation end includes an integral latch wall further defining a ledge.

10. The retractable hook mechanism as set forth in claim 9, wherein the damper outer body includes an end cap, the damper outer body is mounted to the first aperture in the first side wall of the bowing with the end cap contacting the side wall.

11. The retractable hook mechanism as set forth in claim 10, wherein the damper rotor is mounted to the second aperture in the second side wall.

12. The retractable hook mechanism as set forth in claim 8, wherein the spring contains a first spring leg and a second spring leg, the first spring leg contacts the housing and the second spring leg contacts the mounting hole in the rotation end of the hook.

13. The retractable hook mechanism as set forth in claim 8, wherein the follower includes a follower body mounted to the slot and an extension that operatively engages the cain path formed in the rotation end of the hook.

14. A retractable hook mechanism for use in an automobile interior comprising:
   a hook having a rotation end, the rotation end further defining at least one mounting post, an exterior surface, and an extension protruding outwardly from the exterior surface, wherein the extension is a boss extending radially outwardly from the rotation end of the hook,
   a housing for containing the hook, the housing defining at least one mounting hole for receiving the at least one mounting post, and
   a latch mounted to the housing, the latch defining a contoured guide path wall further defining a guide path, the extension operatively engaging the guide path, wherein the latch includes a latch wall further defining a ledge, and at least one leg for the removable mounting of the latch to the housing.

15. The retractable hook mechanism as set forth in claim 14, wherein the boss is diamond shaped.

16. A retractable hook mechanism for use in an automobile interior comprising:
   a hook having a rotation end, the rotation end further defining at least one mounting post, an exterior surface, and an extension protruding outwardly from the exterior surface,
   a housing for containing the hook, the housing defining at least one mounting hole for receiving the at least one mounting post, and
   a latch mounted to the housing, the latch defining a guide path wall further defining a guide path, the extension operatively engaging the guide path, wherein the latch includes a plurality of mounting legs and a latch wall defining a ledge that is positioned within the guide path wall.

* * * * *